(12) United States Patent
Oesterreicher et al.

(10) Patent No.: US 6,978,452 B2
(45) Date of Patent: Dec. 20, 2005

(54) UPGRADING DIGITAL MEDIA SERVERS (75) Inventors: Richard T. Oesterreicher, Naples, FL (US); Craig Murphy, Kirkland, WA (US)

(73) Assignee: Beach Unlimited LLC, Las Vegas, NV (US)

( * ) Notice: Subject to any disclaimer, the term of this patent is extended or adjusted under 35 U.S.C. 154(b) by 189 days.

(21) Appl. No.: 10/406,108

(22) Filed: Apr. 2, 2003

(65) Prior Publication Data

US 2004/0197073 A1 Oct. 7, 2004

(51) Int. Cl.$^7$ .............................................. G06F 9/44
(52) U.S. Cl. ..................... 717/171; 717/175; 386/46; 386/125; 709/203
(58) Field of Search ........ 709/200–203; 717/168–178; 386/46, 125

(56) References Cited

U.S. PATENT DOCUMENTS

| | | | |
|---|---|---|---|
| 5,210,854 A | * | 5/1993 | Beaverton et al. .......... 717/174 |
| 5,432,927 A | * | 7/1995 | Grote et al. ................... 713/2 |
| 5,867,713 A | * | 2/1999 | Shrader et al. ............. 717/176 |
| 5,870,611 A | * | 2/1999 | London Shrader et al. . 717/175 |
| 6,101,327 A | * | 8/2000 | Holte-Rost et al. ......... 717/170 |
| 6,266,736 B1 | * | 7/2001 | Atkinson et al. ........... 711/103 |
| 6,463,584 B1 | * | 10/2002 | Gard et al. .................. 717/171 |
| 2002/0170052 A1 | * | 11/2002 | Radatti ........................ 717/171 |
| 2003/0018964 A1 | * | 1/2003 | Fox et al. .................... 717/177 |
| 2003/0051235 A1 | * | 3/2003 | Simpson ...................... 717/174 |
| 2003/0066065 A1 | * | 4/2003 | Larkin ......................... 717/177 |
| 2004/0133888 A1 | * | 7/2004 | Ard et al. .................... 717/174 |
| 2004/0255293 A1 | * | 12/2004 | Spotswood ................. 717/176 |

FOREIGN PATENT DOCUMENTS

WO   WO98/5462   12/1998

OTHER PUBLICATIONS

Niemeyer et al., Learning Java, p. 179-181, 557-593 (May 2000).
Extensible Firmware Interface, <http://www.intel.com/technology/efi/index.htm>.
Auto Update Server, <http://www.cisco.com/warp/public/cc/pd/wr2k/vpmnso/ps3993/index.shtml>.
Georgia Tech DEOS Project, <http://www.cc.gatech.edu/systems/projects/DEOS>.
Clarke et al., An Architecture for Dynamically Extensible Operating Systems (1998).
Clarke et al., An Explicit Binding Model for Runtime Extensible Operating Systems (1999).
Bershad et al., Extensibility, Safety and Performance in the SPIN Operating System (1995).
Peollabauer et al., Cooperative Runtime Management of Adaptive Applications and Distributed Resources (2002).
Salles et al., Security of Runtime Extensible Virtual Environments, p. 3-4 (Sep. 2002).

* cited by examiner

Primary Examiner—St. John Courtenay, III
(74) Attorney, Agent, or Firm—Woodcock Washburn LLP (57) ABSTRACT

A system and method are disclosed for upgrading both hardware and software components of a digital media server without disrupting media delivery services. In a preferred embodiment, the present system and method employ an object-oriented model that allows system servers to remain fully operational while software upgrades at both the operating system and application levels are installed. Additionally, the system and method use redundant or partitionable programmable logic devices to perform firmware upgrades without disrupting media delivery services.

33 Claims, 9 Drawing Sheets

UPGRADING DIGITAL MEDIA SERVERS

FIELD OF THE INVENTION

This invention relates to the field of digital media servers.

BACKGROUND OF THE INVENTION

Digital media servers such as Web-based servers and video-on-demand servers typically include a number of functional components including components for storing digital media, converting such media from file format to wire format, and scheduling the delivery of media packets. During operation, a media server accepts incoming requests for content from clients or administrators and delivers media packets to clients via a network.

Most digital media servers employ a PC-based architecture and run a variety of software components to provide the above-described functionality. Great effort is made during the design of such software components to ensure that they are fully debugged and free from defects. As a practical matter, however, many defects are not discovered during the design phase and are exposed only when the software is put into actual operation.

Defects discovered during system operation are often corrected by performing a software upgrade. Software upgrades are also sometimes performed to supplement or improve server functionality, thus extending a server's competitive life.

To upgrade an executing software component, the component must be stopped, and the replacement version loaded into memory and run. During this period, services normally provided by the component are unavailable.

The consequences of a defect in a media server's operating system may be even more severe. Operating systems are typically designed around a number of tightly coupled modules that supply abstract data structures such as files, memory storage, input/output streams, semaphores, processes, and threads to other programs. Application programs access these abstract structures through an application programming interface (API). A change made to one of these structures may cause side-effects in other structures or modules. Generally, replacement of operating system-level components requires reloading the entire operating system, and is accomplished during a reboot of the server. Thus, operating system-level resources cannot be upgraded without taking the media server offline, and rebooting may take a considerable amount of time before these services can be restored.

Offline servers are unable to accept incoming requests or deliver content to existing sessions. Consequently, an offline server may affect the availability of an entire service network unless adequate redundant servers are available.

Figure 1:
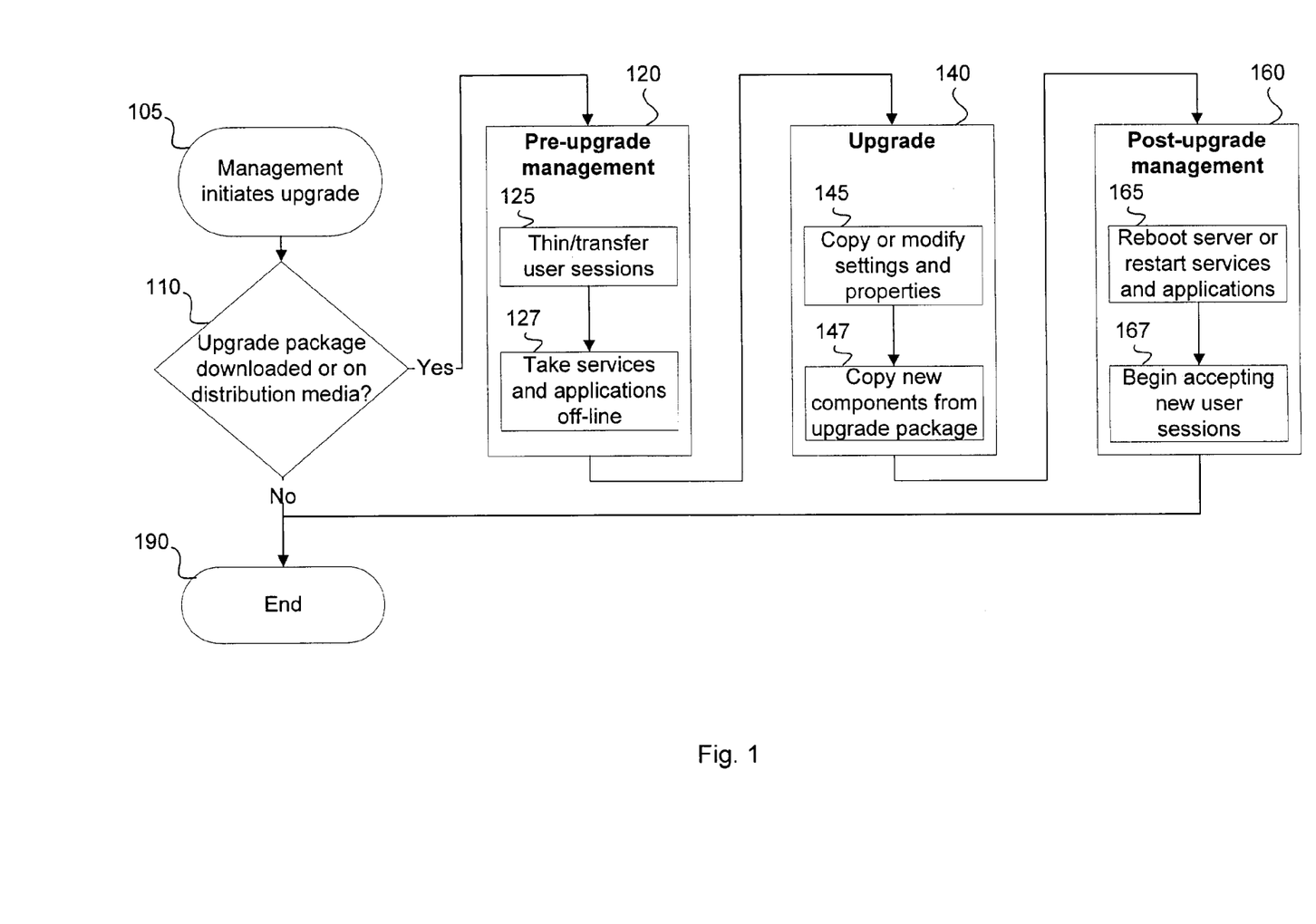
FIG. 1 is a flow diagram illustrating an upgrade process in accordance with the prior art.

FIG. 1 illustrates a typical upgrade process and its effect on network availability. As shown in FIG. 1, in step 105, an upgrade is initiated. Next, in step 110, an upgrade package is detected. If the upgrade package cannot be downloaded, the upgrade process terminates (step 190).

Before the upgrade can be installed, pre-upgrade management steps 120 are performed. In particular, in step 125, user sessions are either thinned or transferred to unaffected machines. Next, in step 127, services affected by the software to be upgraded are discontinued.

Next, upgrade process steps 140 are performed. In particular, in step 145, the settings and properties of the system are either copied or modified. In step 147, new components are copied from the upgrade package. Although some media servers may permit the local or remote transfer of data into the server while it is operating, some service disruption is typically necessary to effect the-upgrade, and in most cases the server must first be brought offline.

Next, post-upgrade process steps 160 are performed. In particular, in step 165, the media server's power is cycled off and then back on (if the server was taken offline), and services provided by the upgraded software are restarted. A single power cycle may last anywhere from a few seconds to several minutes. The amount of time required for a single power cycle depends on how long the server needs to perform an orderly shutdown of running applications before powering off plus the time needed to reboot the server and restore the applications after powering back on. Only after these events are completed can the server begin to accept new user sessions (step 167).

The above process may significantly affect system operation, especially in cases of system-wide upgrades such as an upgrade of all system APIs and low-level drivers. A typical digital-media company may have dozens of on-line media servers affected by such an upgrade. Although the company may select a time for the upgrade when server usage is at its lowest point, the upgrade may still disrupt service to some extent if it necessitates shutting down media servers. At a minimum, the company may experience loss of revenue for the downtime and risk customer dissatisfaction.

To avoid such service disruptions, companies often maintain excess server capacity or redundant systems to handle traffic channeled away from affected servers during an upgrade. But redundant systems introduce additional overhead cost and in many cases are not available.

SUMMARY OF THE INVENTION

A system and method are disclosed for upgrading both hardware and software components of a digital media server without disrupting media delivery services. In a preferred embodiment, the present system and method employ an object-oriented model that allows system servers to remain fully operational while software upgrades at both the operating system and application levels are installed. Additionally, the system and method use redundant or partitionable programmable logic devices to perform firmware upgrades without disrupting media delivery services.

In one aspect, the present invention is directed to a method of upgrading a digital media server comprising checking for the existence of an upgrade package comprising new objects; identifying new objects in the upgrade package; identifying functions and properties of the new objects; evaluating compatibility of the new objects; instantiating new objects as applications objects or services objects; determining whether a new object replaces an old object; and if the new object replaces the old object, replacing the old object.

In another aspect of the present invention, the step of replacing further comprises: locking the old object and the new object; copying fields from the old object to the new object; establishing links from the new object to objects dependent on the old object; rerouting links to the old object from other objects to the new object; unlocking the new object; and removing the old object.

In another aspect of the present invention, the step of removing comprises archiving the old object.

In another aspect of the present invention, the step of removing comprises purging the old object.

In another aspect of the present invention, the upgrade package further comprises one or more new methods for old objects, and the method further comprises: identifying the one or more new methods; evaluating compatibility of the one or more new methods; determining whether a new method replaces an old method; and if the new method replaces the old method, blocking and replacing the old method.

In another aspect of the present invention, the old method is an interface.

In another aspect of the present invention, the method further comprises downloading the upgrade package from a network source.

In another aspect of the present invention, the method further comprises loading the upgrade package from a storage medium.

In another aspect, the present invention is directed to a method of upgrading a digital media server having a partitionable programmable logic device having a first active partition and a second inactive partition, comprising: programming the second partition with new logic; transitioning the second partition from the inactive state to the active state and simultaneously assuming data processing functions from the first partition; and transitioning the first partition to an inactive state.

In another aspect of the present invention, the method further comprises programming the first partition with the new logic.

In another aspect, the present invention is directed to a method of upgrading a digital media server having two or more redundant programmable logic devices, each having an active and inactive state, comprising: determining a first set of programmable logic devices that are in the active state; loading new logic into a second set of one or more logic devices in the inactive state; transitioning the second set of devices to the active state and simultaneously assuming data processing functions from the first set of devices; and transitioning the first set of devices to the inactive state.

In another aspect of the present invention, the method further comprises loading new logic into the first set of devices.

In another aspect, the present invention is directed to a method of installing upgrades on a digital media server comprising a general purpose computer and a hardware engine, the computer comprising an object oriented runtime environment, and the hardware engine comprising a programmable logic device having a first active partition and a second inactive partition, the method comprising: checking for the existence of an upgrade package comprising new objects and new logic; identifying new objects in the upgrade package; identifying functions and properties of the new objects; evaluating compatibility of the new objects; instantiating new objects as applications objects or services objects; determining whether a new object replaces an old object; if the new object replaces the old object, replacing the old object; identifying new logic in the upgrade package; programming the second inactive partition with the new logic; transitioning the second partition from an inactive state to an active state and simultaneously assuming data processing functions from the first active partition; and transitioning the first partition to an inactive state.

In another aspect of the present invention, the step of replacing further comprises: locking the old object and the new object; copying fields from the old object to the new object; establishing links from the new object to objects dependent on the old object; rerouting links to the old object from other objects to the new object; unlocking the new object; and removing the old object.

In another aspect, the present invention is directed to a method of installing upgrades on a digital media server comprising a general purpose computer and a hardware engine, the computer comprising an object oriented runtime environment, and the hardware engine comprising two or more programmable logic devices, each having active and inactive states, the method comprising: checking for the existence of an upgrade package comprising new objects and new logic; identifying new objects in the upgrade package; identifying functions and properties of the new objects; evaluating compatibility of the new objects; instantiating new objects as applications objects or services objects; determining whether a new object replaces an old object; if the new object replaces the old object, replacing the old object; identifying new logic in the upgrade package; determining a first set of programmable logic devices that are in the active state; programming the new logic into a second set of one or more logic devices in an inactive state; transitioning the second set of devices to the active state and simultaneously assuming data processing functions from the first set of devices; and transitioning the first set of devices to the inactive state.

In another aspect of the present invention, the step of replacing further comprises: locking the old object and the new object; copying fields from the old object to the new object; establishing links from the new object to objects dependent on the old object; rerouting links to the old object from other objects to the new object; unlocking the new object; and removing the old object.

In another aspect of the present invention, the upgrade package further comprises one or more new methods for old objects, and the method further comprises: identifying the one or more new methods; evaluating compatibility of the one or more new methods; determining whether a new method replaces an old method; and if the new method replaces the old method, blocking and replacing the old method.

In another aspect of the present invention, the old method is an interface.

In another aspect, the present invention is directed to a digital media server comprising: an object store; and an object-oriented, runtime environment, comprising: service objects, application objects, and an object manager adapted to facilitate the replacement of the service objects and the application objects without disrupting data processing functionality supplied by the service and application objects.

In another aspect of the present invention, the server further comprises a network interface for downloading an upgrade package comprising replacement service and application objects.

In another aspect of the present invention, the server further comprises storage media for storing an upgrade package comprising replacement service and application objects.

In another aspect, the present invention is directed to a digital media server comprising: two or more programmable logic devices, each capable of switching between an active state and an inactive state; an input data path; and an output data path; wherein one or more programmable logic devices in the active state processes digital media arriving on the input data path and presents processed digital media to the output data path while one or more programmable logic devices in the inactive state are programmed.

In another aspect, the present invention is directed to a digital media server comprising: a partitionable programmable logic device having two or more independently programmable partitions, each partition capable of switching between an active state and an inactive state; an input data path; and an output data path; wherein one or more partitions in the active state process digital media arriving on the input data path and present processed digital media to the output data path while one or more partitions in the inactive state are programmed.

In another aspect, the present invention is directed to a digital media server comprising: an object store; an object-oriented, runtime environment, comprising: service objects, application objects, an object manager adapted to facilitate the replacement of the service objects and the application objects without disrupting data processing functionality supplied by the service and application objects; two or more programmable logic devices, each capable of switching between an active state and an inactive state; an input data path; and an output data path; wherein one or more programmable logic devices in the active state processes digital media arriving on the input data path and presents processed digital media to the output data path while one or more programmable logic devices in the inactive state are programmed with new logic.

In another aspect, the present invention is directed to a digital media server comprising: an object store; an object-oriented, runtime environment, comprising: service objects, application objects, an object manager adapted to facilitate the replacement of the service objects and the application objects without disrupting data processing functionality supplied by the service and application objects; a partitionable programmable logic device having two or more independently programmable partitions, each partition capable of switching between an active state and an inactive state; an input data path; and an output data path; wherein one or more partitions in the active state process digital media arriving on the input data path and present processed digital media to the output data path while one or more partitions in the inactive state are programmed with new logic.

DESCRIPTION OF THE PREFERRED EMBODIMENTS

For purposes of illustration and to facilitate understanding of the present invention, the preferred embodiments described below will be described in connection with a particular digital media server.

Figure 2:
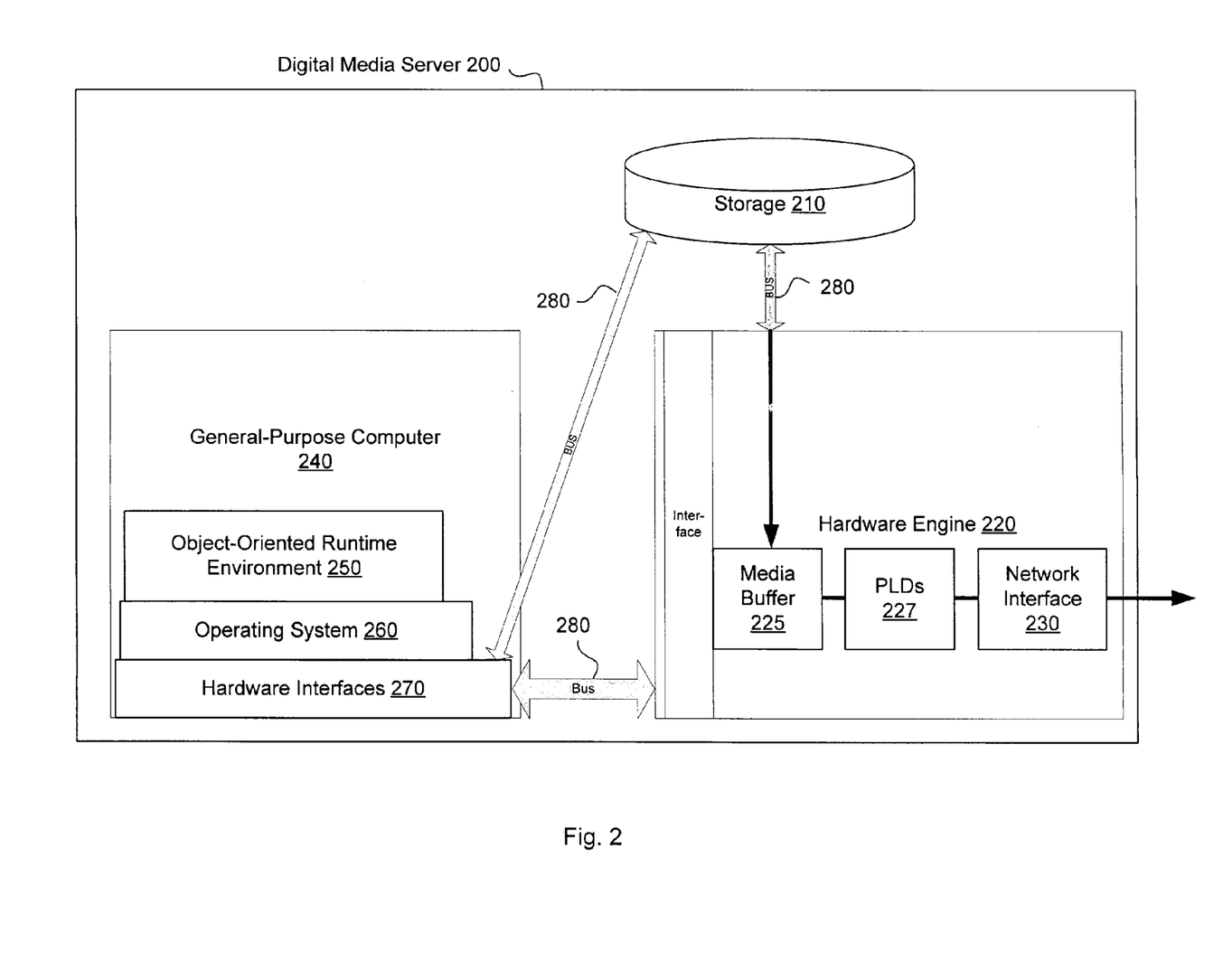
FIG. 2 is a block diagram depicting a preferred embodiment of a digital media server.

As shown in FIG. 2, the digital media server 200 of these preferred embodiments preferably comprises a hardware engine 220, a general-purpose computer 240, and a storage device 210. Hardware engine 220 preferably comprises a media buffer 225, one or more programmable logic devices (PLDs) 227, and a network interface 230. As described in detail below, in a preferred embodiment, hardware engine 220 may comprise a partitionable PLD or redundant PLDs to facilitate media server upgrading without service disruption.

General-purpose computer 240 preferably comprises an object-oriented runtime environment 250, an operating system 260, and hardware interfaces 270. Buses 280 provide data communication paths between hardware engine 220, general-purpose computer 240, and storage 210.

Hardware engine 220 is preferably adapted to generate wire data packets from data stored on storage device 210 and send them to clients across a digital network. In a preferred embodiment, data is copied from storage device 210 to media buffer 225 under control of general-purpose computing device 240. A preferred architecture comprising a general-purpose computing device 240 and hardware engine 220 is described in U.S. patent application Ser. No. 10/369,305, entitled "Hybrid Streaming Platform," filed on Feb. 19, 2003 (and identified by Pennie & Edmonds LLP docket no. 11055-005-999), which is hereby incorporated by reference in its entirety for each of its teachings and embodiments.

PLDs 227 are preferably adapted to convert the copied data in media buffer 225 from file format to wire format. Complete data packets are sent onto the network by network interface 230. A preferred system and method for implementing these steps is described in U.S. patent application Ser. No. 10/369,306, entitled "Flexible Streaming Hardware," filed on Feb. 19, 2003 (and identified by Pennie & Edmonds LLP docket No. 11055-006-999), which is hereby incorporated by reference in its entirety for each of its teachings and embodiments.

Figure 3:
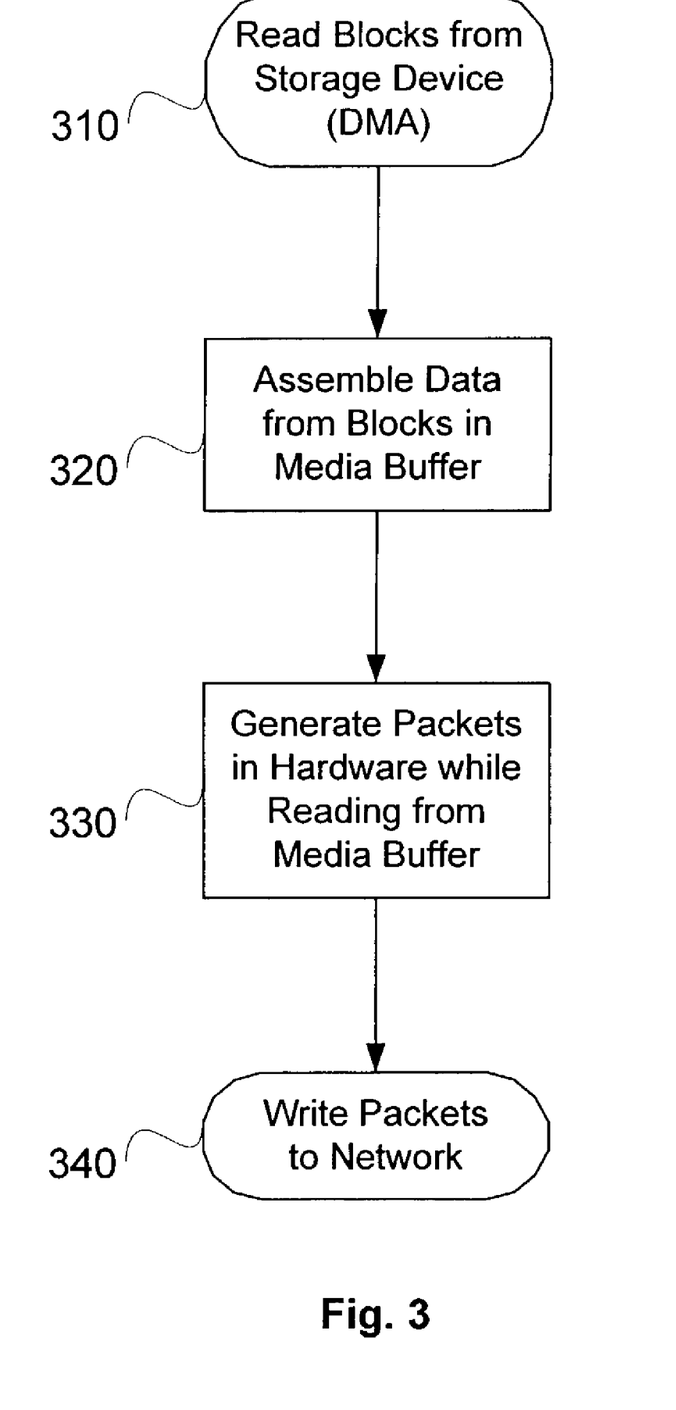
FIG. 3 is a flow diagram illustrating a preferred embodiment of a digital media server streaming process.

A preferred embodiment of a streaming process implemented by digital media server 200 is illustrated in FIG. 3. As shown in FIG. 3, in step 310, blocks of media data are read from storage device 210 and copied directly to media buffer 225 in accordance with instructions from general-purpose computing device 240. In step 320, hardware engine 220 reassembles the media data from the blocks stored in media buffer 225.

In step 330, hardware engine 220 generates data packets while reading from media buffer 225. In step 340, hardware engine 220 transfers the freshly generated data packets to network interface 230, which in turn writes the packets to a digital network. As noted, this process and a platform for implementing it are described in more detail in U.S. patent application Ser. No. 10/369,306, entitled "Flexible Streaming Hardware," filed on Feb. 19, 2003 (and identified by Pennie & Edmonds LLP docket No. 11055-006-999), and Ser. No. 10/369,305, entitled "Hybrid Streaming Platform," filed Feb. 19, 2003 (and identified by Pennie & Edmonds LLP docket No. 11055-005-999), both of which are hereby incorporated by reference in their entirety for each of their teachings and embodiments.

In a preferred embodiment, general-purpose computing device 240 preferably has installed a runtime environment 250 adapted to run object-oriented software programs including programs for accomplishing any desired streaming solutions or other tasks. Such tasks may include session setup, management and teardown of streaming sessions, and error handling. In a preferred embodiment, these programs are designed as object-oriented programs.

Figure 4A:
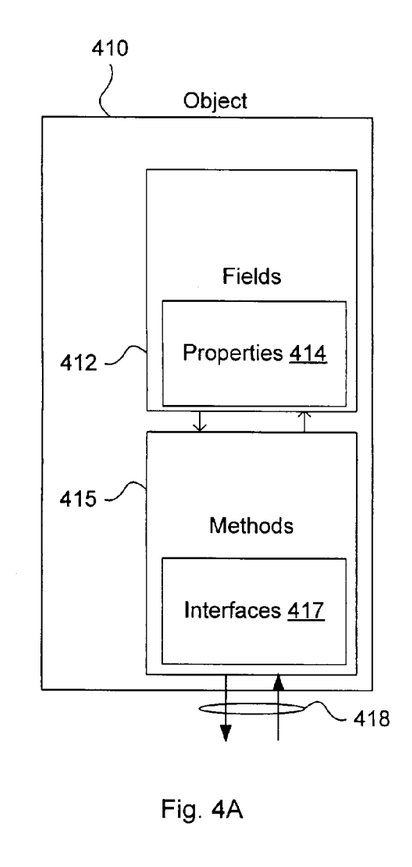
FIG. 4A is an exemplary embodiment of an object.

FIG. 4A illustrates the composition of an object 410 in a preferred embodiment. As shown in FIG. 4A, object 410 preferably comprises fields 412, methods 415, and dynamic references 418. Fields 412 store data within object 410 and comprise data that can be accessed by other objects, known as properties 414, and data hidden from other objects. Fields 412 represent the current state of object 410.

Methods 415 are procedures or functions that may be used to operate on data in fields 412. Methods of an object that may be called by other objects to interact with the object are known as interfaces 417.

Dynamic references 418 represent control and data flow paths between objects 410. An object's references 418 need not be defined before runtime, and can be changed even after object 410 has been created in runtime environment 250.

Figure 4B:
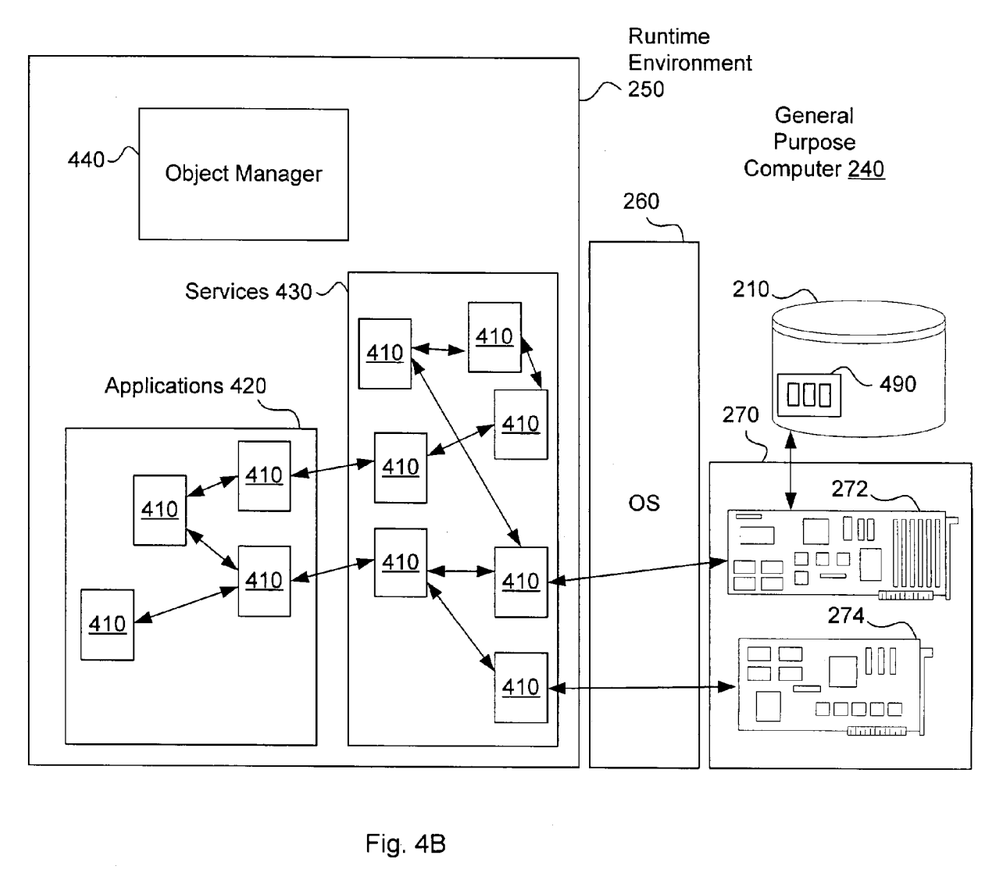
FIG. 4B is a block diagram depicting a preferred embodiment of a general-purpose computing device in one embodiment of the present invention.

FIG. 4B illustrates runtime environment 250 in more detail. Environment 250 preferably comprises applications 420, services 430, and an object manager 440. Applications 420 are a collection of objects designed to perform a certain task. Dynamic references 418 between objects are illustrated as double-headed arrows in FIG. 4B. Services 430 are collections of objects designed to provide an interface between application objects and general-purpose computer 240's operating system (OS) 260 and hardware interfaces 270.

Object manager 440 is preferably responsible for maintaining the state of all objects 410 included in applications 420 and services 430. In a preferred embodiment, object manager 440 validates objects 410 to ensure that these objects are properly formed and not corrupt before loading them into runtime environment 250. Object manager 440 also enumerates the objects and evaluates them to ensure compatibility with object manager 440, environment 250 generally, and other objects 410.

Runtime environment 250 is preferably built on facilities provided by general-purpose computer 240's operating system 260. Application objects can indirectly access hardware 270 by interacting with services 430 through operating system 260. One with skill in the art will recognize that operating system 260 may be implemented using object-oriented components. Such an operating system may be located within runtime environment 250, and operate as an extension of services 430. Effectively, runtime environment 250 may then be viewed as merged with operating system 260. This permits the operating system to be upgraded without interrupting the functionality it provides, as described below.

Hardware 270 preferably includes input-output interface cards 272, 274 for interfacing with objects in the runtime environment as well as data storage 210.

Data storage 210 is a repository that preferably contains definitions for objects or collections of objects known as packages 490. Such packages are typically assembled to make delivery of a collection of objects more convenient.

Upgrade Process

Figure 5:
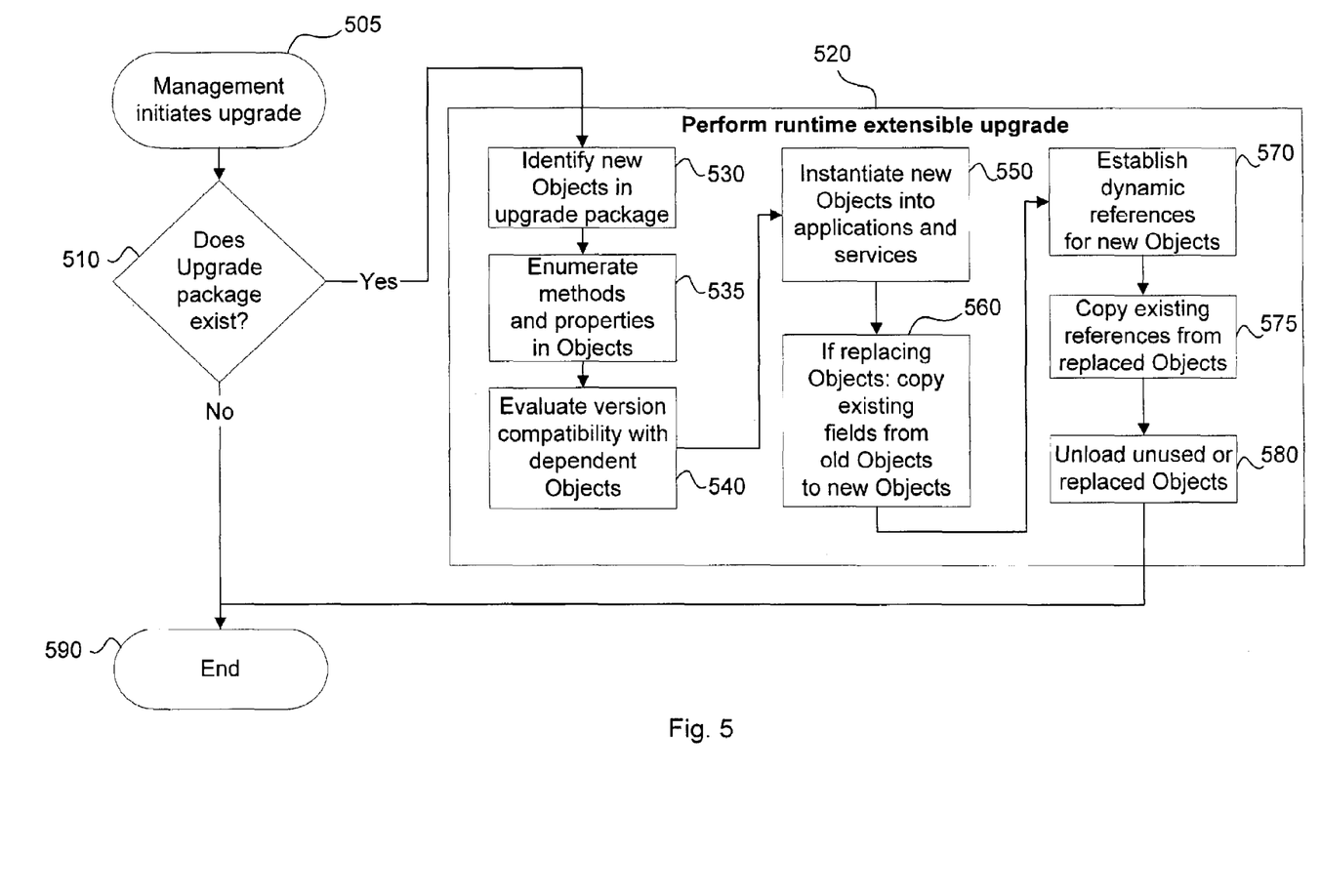
FIG. 5 is a flow diagram illustrating the steps in a preferred embodiment for performing an upgrade process.

A preferred embodiment for upgrading object-oriented software running on general-purpose computer 240 is described in connection with FIG. 5. As shown in FIG. 5, in step 505, a system administrator initiates an upgrade session. In step 510, object manager 440 determines whether an object package 490 (containing upgraded objects) exists in data store 210. If an upgrade package is available, a runtime extensible upgrade is performed in step 520.

Before performing the runtime extensible upgrade (step 520), object manager 440 continually tracks the state of all current instances of objects in environment 250 including their dynamic references 418 to other objects. In step 530, object manager 440 identifies any new objects in upgrade package 490, and, if so, validates that they are properly formed and not corrupt. In step 535, each object in package 490 and the object's corresponding interfaces and properties are enumerated. During this enumeration process, object manager 440 determines how the objects will interact with other objects. Next, in step 540, each object is evaluated for compatibility with other objects that may call it. Also, the object version is preferably checked to ensure that it is compatible with object manager 440 and environment 250, as well as other interacting objects.

In step 550, object manager 440 creates instances of the new objects in appropriate areas of environment 250. Object manager 440 also establishes the logical connections between the new objects and existing services 430 or applications 420.

With respect to new objects that wholly or partially replace functions provided by existing objects, object manager 440 is preferably adapted to direct an orderly transition from those existing objects being replaced to the new objects being installed. This process is referred to herein as staging, and is described in more detail below in connection with FIG. 6. In step 560, object manager 440 copies fields 412 from existing objects into their corresponding replacement objects. Next, in step 570, new dynamic references 418 are established between existing objects that are to remain on line and any new objects. In step 575, existing dynamic references 418 are re-routed to the new objects. This permits an orderly rerouting of object references 418 from existing objects to new objects.

In step 580, objects 410 that are no longer in active use are either permanently purged from environment 250 by object manager 440, or archived to storage 210 for possible later retrieval.

Because an upgrade may include a partial or complete replacement of existing objects, a potential exists for suspension of services or functions provided by objects being replaced. In a preferred embodiment, the present system and method address this issue by staging new replacement objects to avoid service disruption as existing objects are replaced. More specifically, staging allows object manager 440 to transfer active data communication paths from existing objects to new objects during an upgrade rather than disrupting or terminating these data communication paths.

Figure 6:
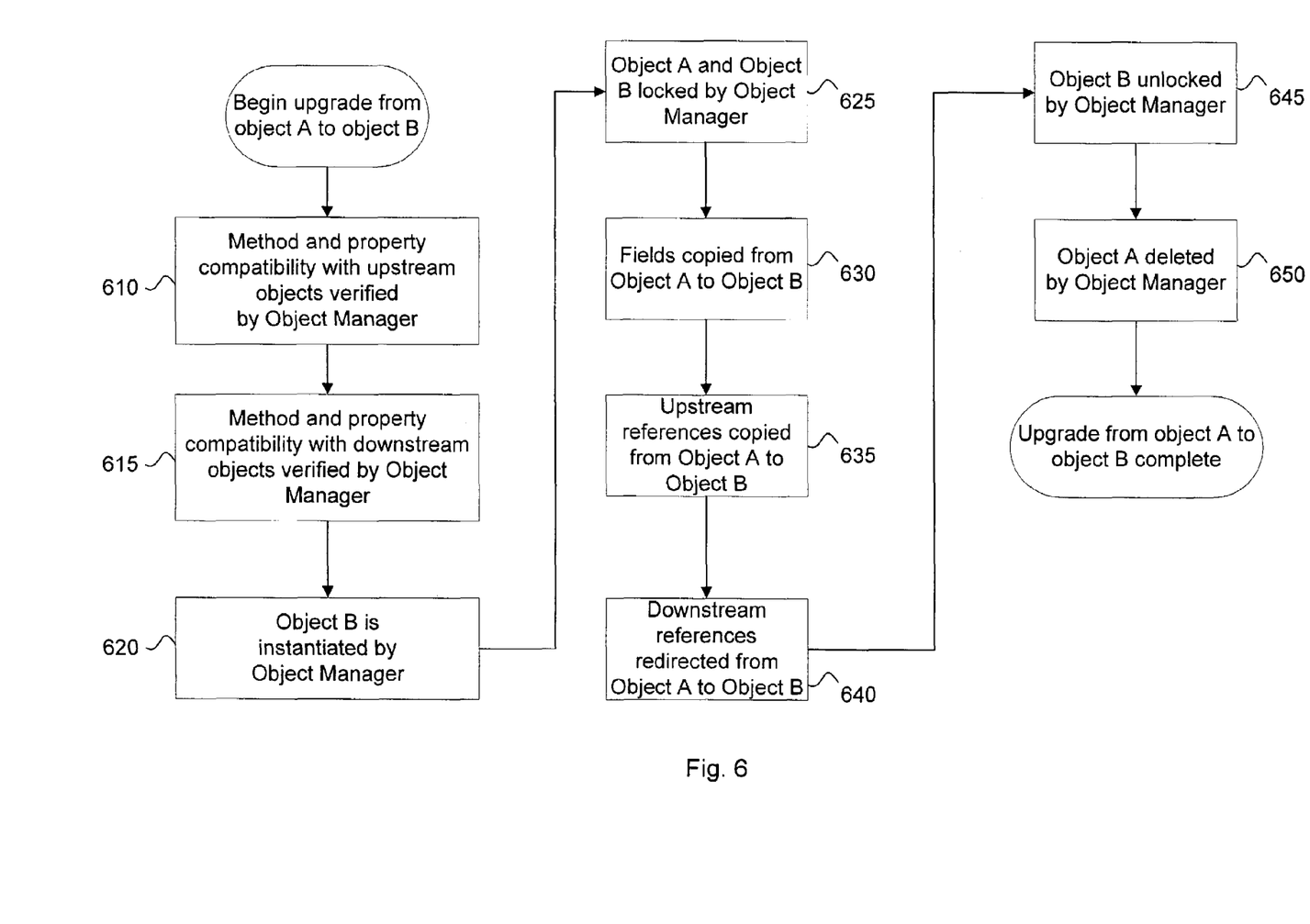
FIG. 6 is a flow diagram illustrating the steps in a preferred embodiment for staging the replacement of objects.

An exemplary staging process is illustrated in FIG. 6. In the exemplary scenario of FIG. 6, object A is being replaced by object B as part of an upgrade. In step 610, object manager 440 verifies that the methods and properties of object B are compatible with upstream objects that object A references. These upstream objects are objects that provide data or services to object A. In step 615, object manager 440 verifies that the methods and properties of object B are compatible with downstream objects that reference object A. These downstream objects are objects that require services or receive data from object A. Once these verifications have been completed, object manager 440 creates an instance of object B in environment 250.

Next, in step 625, object manager 440 locks object A and object B in environment 250. Locking prevents fields 412 of either object from changing, and provides object manager 440 with exclusive access to these objects during the transition from object A to object B.

While the objects are locked in step 630, object manager 440 copies the value of fields found in object A to object B. Then, in step 635, references 418 to upstream objects are copied from object A to object B. Likewise, in step 640, references to object A found in downstream objects are redirected to object B. In step 645, object B is unlocked by object manager 440, thus restoring the services and functionality originally provided by object A but now provided by object B and making available any new services and functionality provided by object B. In step 650, object manager 440 purges or archives object A, thus completing the staging process.

Staging may also comprise a finer-grained approach where an object's methods are changed without replacing the entire object. In such cases, the entire object need not be locked; instead, access to the upgraded method is restricted. For example, suppose that a log writer interface contained in a stream manager object requires upgrading. The stream manager object continues to provide functions to other objects through other methods. The staging process blocks object access to the log writer interface, but does not lock the stream manager object. After the code for the log writer interface has been replaced, objects can resume interaction with the log writer interface.

Run Time Extensible Digital Media Servers

Programmable logic devices 227 in hardware engine 220 do not typically comprise an operating system like general-purpose computer 240. Instead, PLDs 227 are typically designed with programmable logic to efficiently accomplish a relatively limited set of data processing tasks, as described above. Two preferred embodiments for maintaining media delivery at full capacity during an upgrade of the programmable logic found in a PLD 227 are described below.

In the first preferred embodiment, each PLD 227 is capable of selectively partitioning and reprogramming specific portions of the device, leaving other non-affected portions operating normally. In the second preferred embodiment, hardware engine 220 comprises redundant PLDs. These embodiments are described in connection with FIGS. 7A–B and FIGS. 8–9.

Figure 7A:
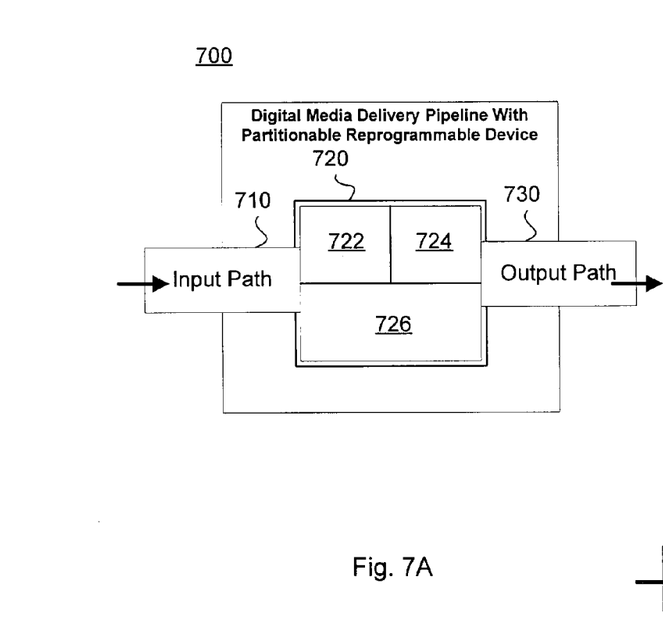
FIG. 7A is a block diagram illustrating a preferred embodiment of a digital media delivery pipeline with a partitionable reprogrammable logic device.

FIG. 7A illustrates the partitionable, PLD embodiment. In this embodiment, a digital media delivery pipeline 700 preferably comprises a data path 710 and a partitionable reprogrammable logic device 720. Partitionable programmable logic device 720 preferably includes a plurality of partitions, (e.g., 722, 724, 726) each of which may be separately reprogrammed while the other partitions continue to operate.

Figure 8:
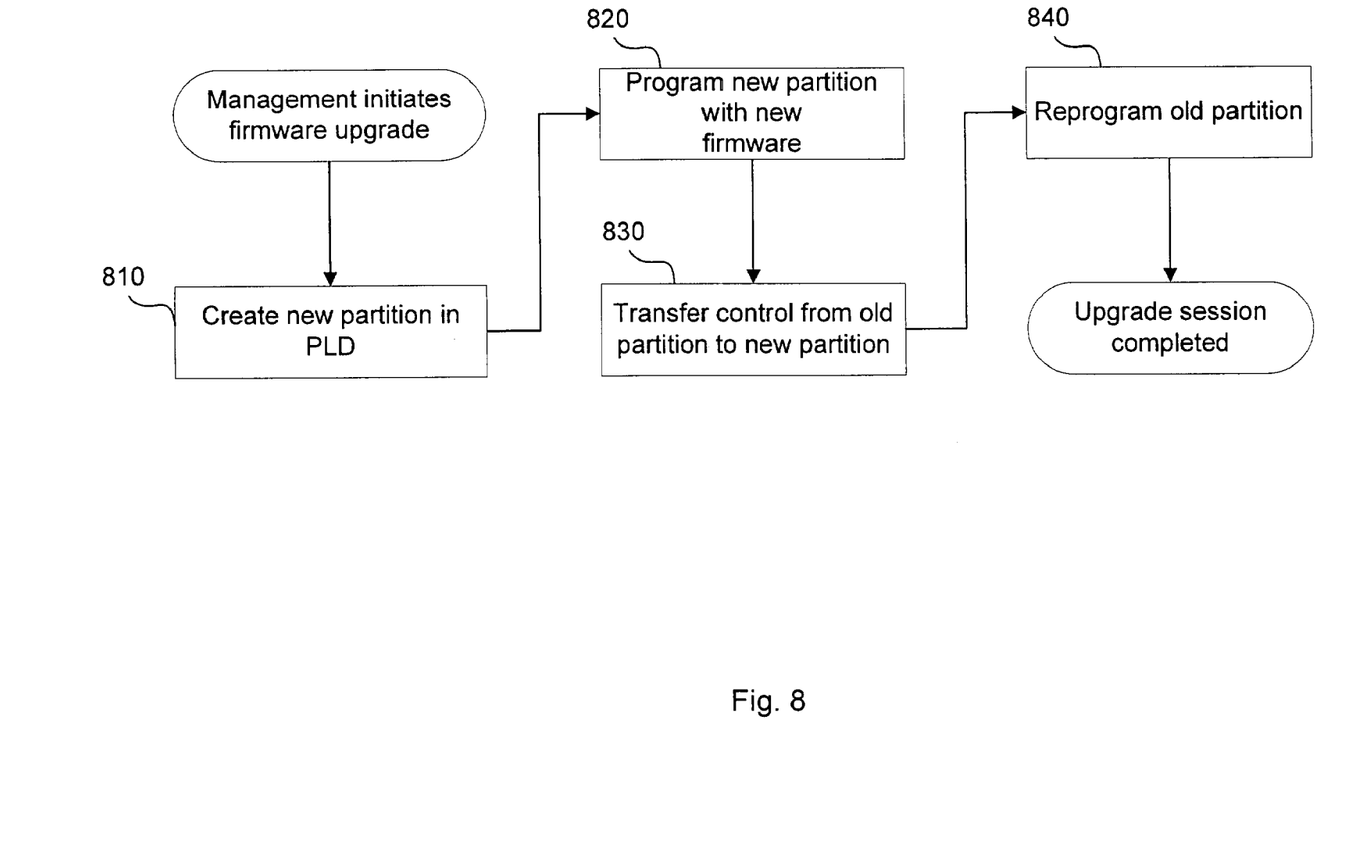
FIG. 8 is a flow diagram illustrating a preferred embodiment for performing a firmware upgrade of a hardware engine with a partitionable programmable logic device.

An example of a firmware upgrade process for partitionable PLD 700 is illustrated in more detail in FIG. 8. As shown in FIG. 8, in step 810, when a system administrator initiates a firmware upgrade, a new partition is created in PLD 700. Next, in step 820, the partition is programmed with a new set of hardware description language (HDL) logic. In step 830, an operational transfer is made, wherein the partition takes control of processing functions from an original partition that it is replacing. More specifically, the new, inactive partition is transitioned to the active state, and supplies the processing functions necessary to continue streaming digital media. Concurrently, the original partition is transitioned to an inactive state. Then, in step 840, the original partition is reprogrammed, thus completing the upgrade session.

Figure 7B:
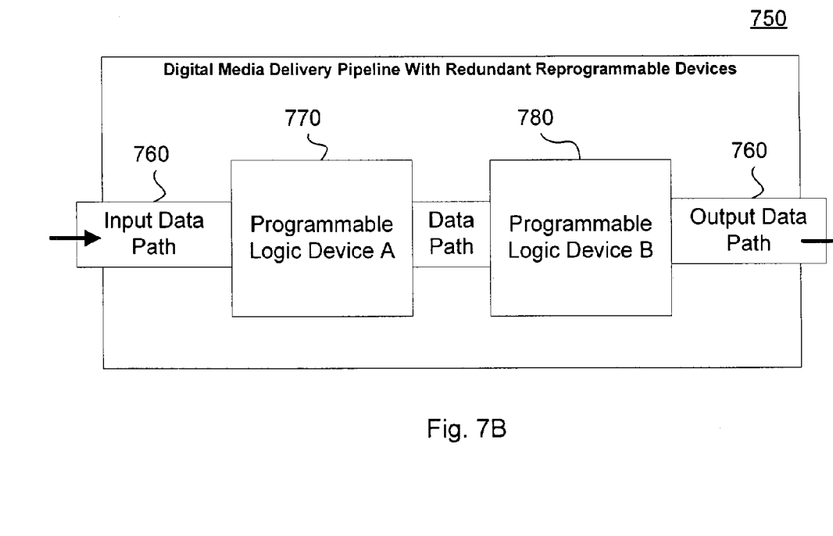
FIG. 7B is a block diagram illustrating a preferred embodiment of a digital media delivery pipeline with redundant reprogrammable devices.

FIG. 7B illustrates the redundant logic device embodiment. In this embodiment, a digital media delivery pipeline 750 preferably includes a data path 760, a first programmable logic device 770 (PLD-A), and a second programmable logic device 780 (PLD-B). The inactive device merely passes data through path 760.

With this redundant approach, one PLD may be left available for reprogramming while the other responds to requests from general-purpose computer 240. Later, the two PLDs may again swap control so that the other may be upgraded. A firmware upgrade may thus be completed without disrupting digital media delivery service.

Figure 9:
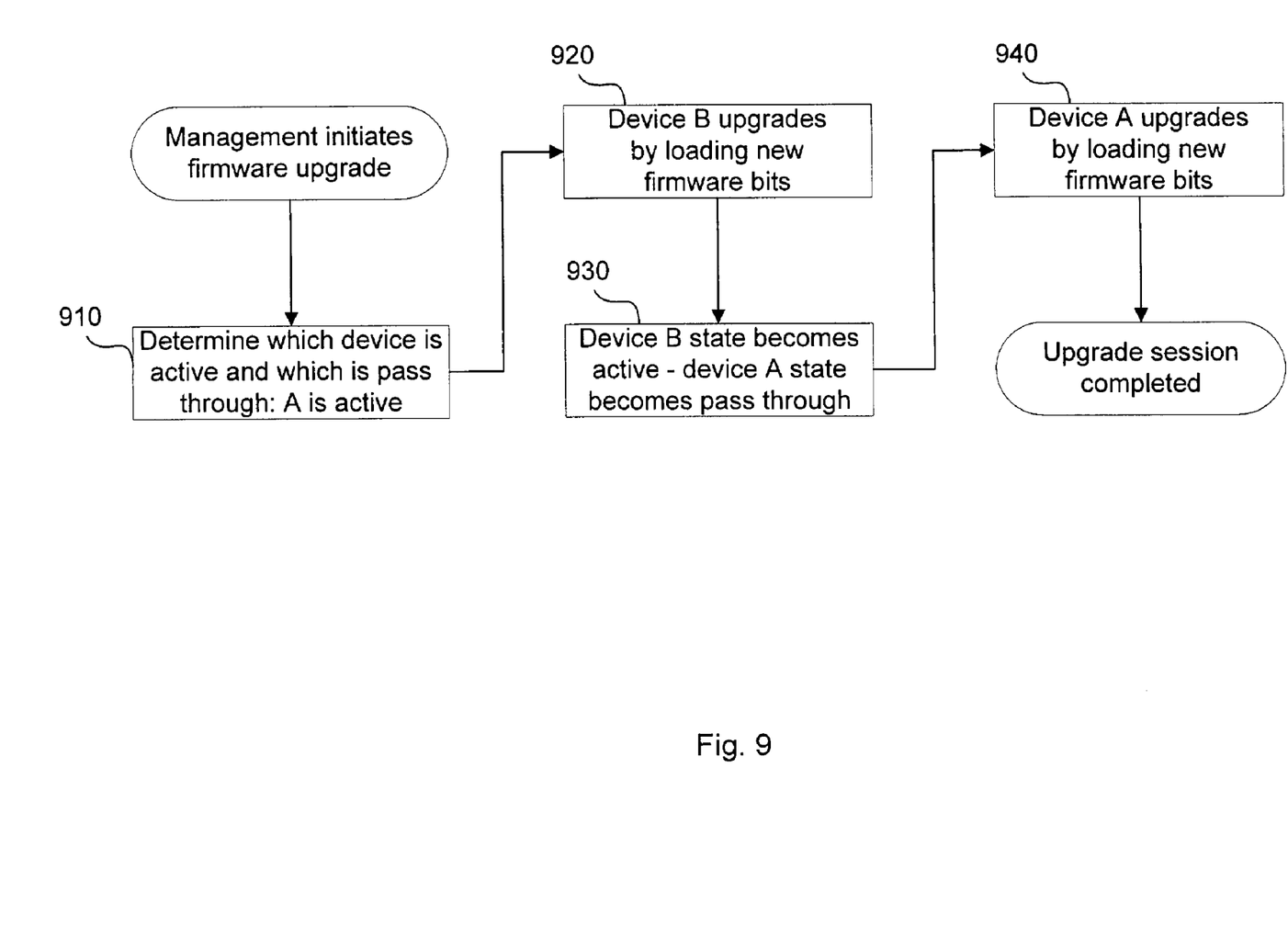
FIG. 9 is a flow diagram illustrating a preferred embodiment for performing a firmware upgrade of a hardware engine with redundant programmable logic devices.

An example of a firmware upgrade process for redundant PLD pipeline 750 is illustrated in more detail in FIG. 9. As shown in FIG. 9, in step 910, when a system administrator initiates a firmware upgrade, a determination is made as to which device 770, 780 is active and which is inactive or pass-through. For purposes of the exemplary scenario of FIG. 7B, it will be assumed that PLD-A 770 is active. Next, in step 920, PLD-B 780 is upgraded by loading a new set of hardware description language (HDL) logic. In step 930, an operational transfer is made, wherein PLD-B 780 becomes the active device, and PLD-A 770 becomes inactive. Then, in step 940, PLD-A is upgraded with a new set of HDL logic, thus completing the upgrade session.

While the invention has been described in conjunction with specific embodiments, it is evident that numerous alternatives, modifications, and variations will be apparent to those persons skilled in the art in light of the foregoing description.

What is claimed is:

1. A method of upgrading a digital media server comprising an object oriented runtime environment implemented in a memory, the method comprising:
   checking for the existence of an upgrade package comprising new objects;
   identifying new objects in the upgrade package;
   identifying functions and properties of the new objects;
   evaluating compatibility of the new objects;
   instantiating new objects as applications objects or services objects in the memory;
   determining whether a new object replaces an old object in the object oriented runtime environment; and
   if the new object replaces the old object, replacing the old object.

2. The method of claim 1, wherein the step of replacing further comprises:
   locking the old object and the new object;
   copying fields from the old object to the new object;
   establishing links from the new object to objects dependent on the old object;
   rerouting links to the old object from other objects to the new object;
   unlocking the new object; and
   removing the old object.

3. The method of claim 2, wherein the step of removing comprises archiving the old object.

4. The method of claim 2, wherein the step of removing comprises purging the old object.

5. The method of claim 1, wherein the upgrade package further comprises one or more new methods for old objects, the method further comprising:
   identifying the one or more new methods;
   evaluating compatibility of the one or more new methods;

determining whether a new method replaces an old method; and if the new method replaces the old method, blocking and replacing the old method.

6. The method of claim 5, wherein the old method is an interface.

7. The method of claim 1, further comprising downloading the upgrade package from a network source.

8. The method of claim 1, further comprising loading the upgrade package from a storage medium.

9. A method of installing upgrades on a digital media server comprising a general purpose computer and a hardware engine, the computer comprising an object oriented runtime environment, and the hardware engine comprising a programmable logic device having a first active partition and a second inactive partition, the method comprising:

checking for the existence of an upgrade package comprising new objects and new logic;
identifying new objects in the upgrade package;
identifying functions and properties of the new objects;
evaluating compatibility of the new objects;
instantiating new objects as applications objects or services objects;
determining whether a new object replaces an old object in the object oriented runtime environment;
if the new object replaces the old object, replacing the old object;
identifying new logic in the upgrade package;
programming the second inactive partition with the new logic;
transitioning the second partition from an inactive state to an active state and simultaneously assuming data processing functions from the first active partition; and
transitioning the first partition to an inactive state.

10. The method of claim 9, further comprising programming the first partition with the new logic.

11. The method of claim 9, further comprising downloading the upgrade package from a network source.

12. The method of claim 9, further comprising loading the upgrade package from a storage medium.

13. The method of claim 9, wherein the step of replacing further comprises:

locking the old object and the new object;
copying fields from the old object to the new object;
establishing links from the new object to objects dependent on the old object;
rerouting links to the old object from other objects to the new object;
unlocking the new object; and
removing the old object.

14. The method of claim 13, wherein the step of removing comprises archiving the old object.

15. The method of claim 13, wherein the step of removing comprises purging the old object.

16. A method of installing upgrades on a digital media server comprising a general purpose computer and a hardware engine, the computer comprising an object oriented runtime environment, and the hardware engine comprising two or more programmable logic devices, each having active and inactive states, the method comprising:

checking for the existence of an upgrade package comprising new objects and new logic;
identifying new objects in the upgrade package;
identifying functions and properties of the new objects;
evaluating compatibility of the new objects;
instantiating new objects as applications objects or services objects;
determining whether a new object replaces an old object in the object oriented runtime environment;
if the new object replaces the old object, replacing the old object;
identifying new logic in the upgrade package;
determining a first set of programmable logic devices that are in the active state;
programming the new logic into a second set of one or more logic devices in an inactive state;
transitioning the second set of devices to the active state and simultaneously assuming data processing functions from the first set of devices; and
transitioning the first set of devices to the inactive state.

17. The method of claim 16, further comprising programming the new logic into the first set of devices.

18. The method of claim 16, further comprising downloading the upgrade package from a network source.

19. The method of claim 16, further comprising loading the upgrade package from a storage medium.

20. The method of claim 16, wherein the step of replacing further comprises:

locking the old object and the new object;
copying fields from the old object to the new object;
establishing links from the new object to objects dependent on the old object;
rerouting links to the old object from other objects to the new object;
unlocking the new object; and
removing the old object.

21. The method of claim 20, wherein the step of removing comprises archiving the old object.

22. The method of claim 20, wherein the step of removing comprises purging the old object.

23. The method of claim 16, wherein the upgrade package further comprises one or more new methods for old objects, the method further comprising:

identifying the one or more new methods;
evaluating compatibility of the one or more new methods;
determining whether a new method replaces an old method; and
if the new method replaces the old method, blocking and replacing the old method.

24. The method of claim 23, wherein the old method is an interface.

25. A digital media server comprising:
an object store; and
an object-oriented, runtime environment, comprising:
service objects,
application objects, and
an object manager adapted to facilitate the replacement of the service objects and the application objects without disrupting data processing functionality supplied by the service and application objects.

26. The server of claim 25, further comprising a network interface for downloading an upgrade package comprising replacement service and application objects.

27. The server of claim 25, further comprising storage media for storing an upgrade package comprising replacement service and application objects.

28. A digital media server comprising:
an object store;
an object-oriented, runtime environment, comprising:
service objects,
application objects,
an object manager adapted to facilitate the replacement of the service objects and the application objects without disrupting data processing functionality supplied by the service and application objects;

two or more programmable logic devices, each capable of switching between an active state and an inactive state;

an input data path; and an output data path;

wherein one or more programmable logic devices in the active state processes digital media arriving on the input data path and presents processed digital media to the output data path while one or more programmable logic devices in the inactive state are programmed with new logic.

29. The server of claim 28, further comprising a network interface for downloading an upgrade package comprising replacement service and application objects and new logic.

30. The server of claim 28, further comprising storage media for storing an upgrade package comprising replacement service and application objects and new logic.

31. A digital media server comprising:

an object store;

an object-oriented, runtime environment, comprising:

service objects, application objects, an object manager adapted to facilitate the replacement of the service objects and the application objects without disrupting data processing functionality supplied by the service and application objects;

a partitionable programmable logic device having two or more independendy programmable partitions, each partition capable of switching between an active state and an inactive state;

an input data path; and an output data path;

wherein one or more partitions in the active state process digital media arriving on the input data path and present processed digital media to the output data path while one or more partitions in the inactive state are programmed with new logic.

32. The server of claim 31, further comprising a network interface for downloading an upgrade package comprising replacement service and application objects and new logic.

33. The server of claim 31, further comprising storage media for storing an upgrade package comprising replacement service and application objects and new logic.

* * * * *